US005668941A

United States Patent [19]

Noorbakhsh

[11] Patent Number: 5,668,941
[45] Date of Patent: Sep. 16, 1997

[54] OPTIMUM IMPLEMENTATION OF X-Y CLIPPING ON PIXEL BOUNDARY

[75] Inventor: Ali Noorbakhsh, Danville, Calif.

[73] Assignee: Cirrus Logic, Inc., Fremont, Calif.

[21] Appl. No.: 493,665

[22] Filed: Jun. 22, 1995

[51] Int. Cl.[6] .................................................. G06T 15/30
[52] U.S. Cl. ........................... 345/434; 345/525; 345/190
[58] Field of Search .................................. 395/162, 164, 395/166, 501, 521, 522, 523, 524, 525, 526, 134, 133, 515, 516; 345/190, 200

[56] References Cited

U.S. PATENT DOCUMENTS

| | | | |
|---|---|---|---|
| 4,779,210 | 10/1988 | Katsura et al. | 395/134 |
| 4,837,563 | 6/1989 | Mansfield et al. | 345/133 |
| 4,845,656 | 7/1989 | Nishibe et al. | 395/525 |
| 4,887,228 | 12/1989 | Robert | 395/129 |
| 4,967,378 | 10/1990 | Rupel et al. | 395/164 |
| 4,982,345 | 1/1991 | Callahan et al. | 395/134 |
| 4,984,183 | 1/1991 | Ohuchi | 395/134 |
| 5,016,191 | 5/1991 | Radochonski | 395/132 |
| 5,027,291 | 6/1991 | Callahan et al. | 395/133 |
| 5,029,106 | 7/1991 | Kai et al. | 395/143 |
| 5,036,475 | 7/1991 | Ueda | 395/164 |
| 5,103,499 | 4/1992 | Miner et al. | 395/162 |
| 5,175,816 | 12/1992 | Kimura et al. | 395/166 |
| 5,218,674 | 6/1993 | Peaslee et al. | 395/166 |
| 5,224,210 | 6/1993 | Pinedo et al. | 395/164 |
| 5,251,298 | 10/1993 | Nally | 395/166 |
| 5,255,360 | 10/1993 | Peaslee et al. | 395/162 |
| 5,294,918 | 3/1994 | Preston et al. | 345/155 |
| 5,315,696 | 5/1994 | Case et al. | 395/133 |
| 5,317,519 | 5/1994 | Maeda | 364/474.26 |
| 5,329,613 | 7/1994 | Brase et al. | 395/122 |
| 5,353,403 | 10/1994 | Kohiyama et al. | 395/164 |
| 5,357,620 | 10/1994 | Suzuki | 395/421.1 |
| 5,414,524 | 5/1995 | Payson et al. | 358/426 |
| 5,437,011 | 7/1995 | Guttag et al. | 395/502 |
| 5,454,076 | 9/1995 | Cain | 395/164 |
| 5,479,606 | 12/1995 | Gray | 395/166 |
| 5,522,021 | 5/1996 | Huang et al. | 395/138 |

OTHER PUBLICATIONS

"Graphic BIT-BLT Copy Under Mask", IBM Technical Disclosure Bulletin, vol. 28, No. 6, pp. 2721–2724 Nov. 1985.

Primary Examiner—Tod R. Swann
Assistant Examiner—Conley B. King, Jr.
Attorney, Agent, or Firm—Robert Platt Bell & Associates, P.C.

[57] ABSTRACT

A method and apparatus for improving performance of bit block transfers in display controllers during clipping functions without significantly increasing gate count. In a clipping function, particularly when transferring a portion of a monochrome bit map and color expanding same or in pattern copying, a source start address may not lie on a byte boundary. In order to avoid using time consuming shift left operations in software, the source start address may be adjusted in hardware to an earlier byte boundary. Upon writing data to a destination address, a hardware byte mask may be employed to prevent writing of the additional data retrieved due to the adjustment of the source start address. The source start address and byte mask hardware may be implemented in hardware using bit block transfer engine components and a small amount of additional hardware. The remainder of the clipping functions may remain in software, for example in a display device driver. By eliminating the shift left operations from the software portion of the clipping function, overall system performance is enhanced.

22 Claims, 10 Drawing Sheets

OPTIMUM IMPLEMENTATION OF X-Y CLIPPING ON PIXEL BOUNDARY

CROSS-REFERENCE TO RELATED APPLICATIONS

The subject matter of this application is related to that in copending application Ser. No. 08/447,493, filed on May 23, 1995, entitled "TECHNIQUE AND APPARATUS FOR COLOR EXPANSION INTO A NON-ALIGNED 888-RGB COLOR-SPACE FORMAT" incorporated herein by reference.

FIELD OF THE INVENTION

The present invention relates to improvements in BITBLT engines, particularly as applied to a display controller such as a Video Graphics Adapters (VGA) or the like having a clipping function.

BACKGROUND OF THE INVENTION

A Bit-aligned Block Transfer (BITBLT) is a general operator which provides a mechanism to move an arbitrary size rectangle of an image from one part of a display memory to another. This operation may be performed by a hardware BITBLT engine otherwise known as a BITBLT engine or blitter. A display controller (e.g., Video Graphic Adapter (VGA) or the like) with this capability may be referred to as a display controller with a BITBLT engine or BITBLT hardware accelerator.

A clipping function is a mechanism to cut an edge of an arbitrary size rectangle of an image located either in system memory or display memory before transferring the image to a destination in display memory. FIG. 4 illustrates a software solution for performing such clipping functions in a system provided with a display controller 402 with built-in BITBLT engine for performing bit block transfers.

The sequence of a bit block transfer operation are as follows. First, a block of data may be read from a portion of a source memory and a portion of a destination memory. The source memory may be display memory 403 of display controller 402 or a system memory (not shown) for host computer 401. The destination memory may be display memory 403 of display controller 402. Display controller 402 retrieves the resultant image data stored in display memory 403 and outputs a signal to generate an image on display 404.

Next, data from the portion of the source memory may be combined with data from the portion of the destination memory using the BITBLT engine within display controller 402. This combination of data, known as Raster Op, may be any logical operation which may be used between elements of data from the source memory and destination memory. As Raster Op operations are completed, resultant data may be written into destination memory. Thus, for example, data from a source memory representing text information, may be combined with a graphic image in a destination memory to product a text over graphics image in the destination memory.

The sequence of a clipping operation is as follows. First, a block of data from the source memory is "cut" in X and Y directions, where X and Y represent ordinate axes. Next, the remaining results are written into the destination memory.

In a Windows™ application, when data from a source memory is to be copied into destination memory and a clip rectangle has been defined, the cross-section of the destination rectangle and clip rectangle may be the area in which source data must be copied. Anything outside of this cross-section region should not be written to the destination memory. Such a situation is illustrated in FIG. 1. In FIG. 1, the cross-section of the BITBLT destination rectangle and the clip rectangle is called the clip cross-section rectangle. In the example illustrated in FIG. 1, it is assumed that the source data is located in display memory 403, although alternately, source data may be located in a system memory of host computer 401.

In order to cut a destination rectangle block in the X and Y directions (illustrated in FIG. 1 as X-offset and Y-offset) the following algorithm may be employed.

$$X\text{-Offset} = (DSACLP - DSAB) \bmod DSP \quad \text{(EQ 1)}$$

$$Y\text{-Offset} = (DSACLP - DSAB) \operatorname{div} DSP \quad \text{(EQ 2)}$$

$$WCS = WBLT - (X\text{-Offset}) \quad \text{(EQ 3)}$$

$$HCS = HBLT - (Y\text{-Offset}) \quad \text{(EQ 4)}$$

Where:
DSAB=Destination Start Address of BITBLT Rectangle
DSACLP=Destination Start Address of Clip Rectangle
DSP=Destination Pitch
WCS=Width of Cross-Section Rectangle
WBLT=Width of BITBLT Rectangle
HCS=Height of Cross-Section Rectangle
HBLT=Height of BITBLT Rectangle After calculating WCS and HCS having a DSACLP, one may program the BITBLT engine with calculated width, height, and new destination start address (DSAB) to write only cross-section rectangle data into the destination memory. The calculations of Equations 1–4 may be performed by software 406 in FIG. 4. HBLT and WBLT maybe calculated in X-Y coordinate conversion and BITBLT parameter generation software 405 illustrated in FIG. 4. Writing cross-section rectangle data into a destination area in display memory 403 may be performed by a BITBLT engine.

The following example illustrates the above-described procedure in more detail. For the purposes of illustration, assume a color depth of eight bits per pixel (bpp), a typical color depth for VGA displays. Parameters, in hexadecimal, for the variables recited above may be as follows:

DSAB=A6480
DSACLP=AC4F1
SSP=280
DSP=280
WBLT=200
HBLT=100

Applying these values into Equations 1–4 above yields equations 5–8 below. Again, the values shown are in hexadecimal.

$$X\text{-Offset} = (AC4F1 - A6480) \bmod 280 = 171 \quad \text{(EQ 5)}$$

$$Y\text{-Offset} = (AC4F1 - A6480) \operatorname{div} 280 = 26 \quad \text{(EQ 6)}$$

$$WCS = 200 - (171) = 8F \quad \text{(EQ 7)}$$

$$HCS = 100 - (26) = DA \quad \text{(EQ 8)}$$

Now, using a BITBLT engine, the cross-section rectangle may be written into destination memory using the following parameters. The start address of the clip rectangle of the destination memory (DSACLP) is AC4F1 and has a width WCS of 8Fh or 143 bytes and a height HCS of DA (hex) or 218 lines (i.e., scan lines). A new source memory start address (NSSA) may be calculated from the original source memory start address (OSSA) as follows:

$$NSSA=OSSA-(DSACLP-DSAB) \quad \text{(EQ 9)}$$

$$NSSA=OSSA-(AC4F1-A6480) \quad \text{(EQ 9a)}$$

After calculating WCS and HCS and having a DSACLP, one can program the BITBLT engine with calculated width WCS, height HCS, new source start address (NSSA), and new destination start address (DSAB) to write only into the calculated cross-section rectangle area.

In general, the procedure for clip cross-section rectangle calculation may be performed by software without a significant impact on overall system performance. However, in some instances, a software solution may be insufficient and may degrade overall sufficient performance.

In performing clipping functions, there may be two cases in which hardware may accelerate system performance. First, when the source data is a monochrome bit map of a schematic or the like which is to be copied into destination memory. The second case is where the source data is a pattern used to fill a portion of destination memory.

In a monochrome bit map, the start address of a clip cross-section rectangle may be calculated and driven through software programming which may be part of a program of a graphics card driver. The start address of the cross-section rectangle may have a corresponding aligned data byte in the source memory which may be used and expanded through the BITBLT engine with a color expansion function.

In other words, in a monochrome bit map, each bit of data (0 or 1) may represent a single pixel of an image. once transferred through the BITBLT engine, color expansion features may add pixel depth (e.g., more bits per pixel or bpp) to provide a color image. However, unlike with other data formats, for example, 8 bpp pixel depth, the border of a clipped monochrome bit map image may not fall on an even byte boundary. The beginning of a clipped monochrome bit map may fall, for example, on bit N of a given byte. A mechanism or software must be provided to read the starting bit and correct for such offset.

The start address of the cross-section rectangle may correspond to the Nth bit in a calculate source byte where N=0,1,2, . . . 7, as illustrated in FIG. 2. In the example illustrated in FIG. 2, each double word of source data may have to shift (7−N) times to the left. In a software solution, a loop of shift operations for the entire source data may be very time consuming and degrade the overall performance of the system. For example, if N=7, a total of seven shift operations may have to be performed to retrieve one bit of source data for a monochrome bit map.

In the example of FIG. 2, The start address of the cross-section rectangle may correspond to the fifth bit (i.e., N=5) of unexpanded source data byte three which has to be expanded and written into a portion of display memory 403. In the example of FIG. 2, the following parameters will be used for the purposes of illustration. All values are given in hexadecimal, unless otherwise noted.

DSAB=A6480
DSACLP=A670A
DSP=280
WBLT=16 pixels
HBLT=20 lines
Plugging these values into Equations 1–4 yields:

$$X\text{-Offset}=(A670A-A6480) \bmod 280=10 \text{ pixels} \quad \text{(EQ 10)}$$

$$Y\text{-Offset}=(A670A-A6480) \text{ div } 280=1 \text{ line} \quad \text{(EQ 11)}$$

$$WCS=16-10=6 \text{ pixels} \quad \text{(EQ12)}$$

$$HCS=20-1=19 \text{ lines} \quad \text{(EQ13)}$$

In the example of FIG. 2, color depth may be 8 bits per pixel (bpp). X-Offset at 10 pixels, for a monochrome bit mode (1 bpp) may be equivalent to 1 byte and 2 bits or 10 bits total.

A new source address may be calculated according to the following Equations 14–16.

$$\text{If } (WBLT \bmod 8 > 0) \text{ then } NSBL=WBLT \text{ div } 8+1 \quad \text{(EQ 14)}$$

$$\text{IF } (WBLT \bmod 8 = 0) \text{ then } NSBL=WBLT \text{ div } 8 \quad \text{(EQ 15)}$$

$$NSSA=OSSA+(NSBL*Y\text{-Offset})+(X\text{-Offset div } 8) \quad \text{(EQ 16)}$$

Where:
NSBL=Number of Source Bytes to be expanded per BITBLT Line
OSSA=Old Source Start Address
NSSA=New Source Start Address Applying the values form the example of FIG. 2, to Equations 14–16 yields equations 17–19 below. again, all values shown are in hexadecimal unless stated otherwise.

$$NSBL=WBLT \text{ div } 8=10 \text{ div } 8=2 \quad \text{(EQ 17)}$$

$$NSSA=OSSA+(2*1)+(A \text{ div } 8) \quad \text{(EQ 18)}$$

$$NSSA=OSSA+2+1=OSSA+3 \text{ bytes (EQ 19)}$$

Now the problem is that the start address of the clip cross-section rectangle does not lie within a byte boundary, but rather starts from bit five of the third unexpanded source byte. The software solution to this problem is to perform a Shift Left operation, bit-wise, for every double word of unexpended source data two times (i.e., since bit five is two positions away from bit 7 or the byte boundary) and then use the BITBLT engine to expand the source data from NSSA memory location and write the resultant data into the memory location of clip cross-section rectangle in display memory 403 with the following BITBLT register values.

Destination Start Address (DSAB)=A670A
Width (WBLT)=6 pixels (6 bytes @8 bpp)
Height (HBLT)=19 lines Shifting bit-wise twice in the above example (up to a maximum of seven times in a worst case) may create a substantial penalty in overall system performance when using a software solution.

Another application area where difficulties may arise using a BITBLT engine is a pattern copy operation. As illustrated in FIG. 3, in pattern copy operation, source data may comprise a pattern 301 located in an off-screen portion of display memory 403 representing a pattern image 300. Since the start address of clip rectangle 302 may be a memory location of any pixel on one of an 8 by 8 pattern tile located on the BITBLT rectangle, the left-most tiles of the clip cross-section rectangle may require an offset with some number of pixels with respect to the original pattern.

The result would be a rectangle painted with the same pattern, except the first column pattern tiles may be shifted to the left by the same number of pixels as the Pattern X-Offset value. In the example of FIG. 3, pattern X-Offset has a value of 2 pixels. In addition, if the top of the rectangle has be offset by some number of pixel lines, then the Pattern Y-Offset may define the start line of a first row top pattern tile. In the example of FIG. 3, the Pattern Y-Offset has a value of 3 lines.

For the example of FIG. 3 we assume the following values which are in hexadecimal unless otherwise noted.

DSA=6400

DSACLP=7F8A

WBLT=40 Bytes

HBLT=40 lines

DSP=280

SSP=280

Applying these values, X-Offset and Y-Offset may be calculated using Equations 1-2 as illustrated in Equations 20-21. Again, all values shown are in hexadecimal unless otherwise noted.

$$X\text{-Offset}=(7F8A-6400) \bmod 280 = A = 10 \text{ Bytes} \quad \text{(EQ 20)}$$

$$Y\text{-Offset}=(7F8A-6400) \text{ div } 280 = B = 11 \text{ lines} \quad \text{(EQ 21)}$$

Values for Pattern X-Offset and Pattern Y-Offset may be calculated using equations 22-23 as follows.

$$\text{Pattern } X\text{-Offset}=X\text{-Offset} \bmod 8 = 2 \text{ Bytes} \quad \text{(EQ 22)}$$

$$\text{Pattern } Y\text{-Offset}=Y\text{-Offset} \bmod 8 = 3 \text{ lines} \quad \text{(EQ 23)}$$

In a software solution, the source pattern may be adjusted to include the Pattern X-Offset and pattern Y-Offset into the source pattern and then fill the clip rectangle 302 using the BITBLT engine with the new adjusted source pattern. To adjust the source pattern with Pattern X-Offset and Pattern Y-Offset, it may be necessary to fill out four adjacent pattern tiles in an off-screen potion of display memory with the source pattern, then, a new source start address of the 8 by 8 pattern may be calculated, taking into account the Pattern X-Offset and Pattern Y-Offset values. Readjusting the source pattern may require at least two extra BITBLT operations to fill out the four adjacent pattern tiles. These extra BITBLT operations may degrade overall system performance.

One partial solution to the above-described difficulties is to enable the clipping function in hardware rather than software, as illustrated in FIG. 5. The incorporation of BITBLT engine into display controller 502 and its sequence may make a hardware clipping function relatively easy to implement. Display controller 502 may incorporate a BIT-BLT engine and hardware module to perform the functions of software modules 405 and 406 in FIG. 4. Source data may be received from host processor 501 or from display memory 503, processed by the BITBLT engine and stored in display memory 503. Display controller 502 may retrieve resultant image data from display memory 503 and output a signal to display 504 to generate the resultant image.

However, a hardware clipping function may create a serious penalty in gate count in control logic. For a display controller (e.g., Video Graphics Adapter or the like) as in any electronic design, it may be desirable to minimize additional gates required to perform various functions.

Referring to FIG. 5, the conventional hardware solution for the clipping function is to store X and Y coordinates of the clip rectangle (i.e., beginning and end coordinates) inside registers of display controller 502 through system I/O write cycles from host CPU 501 and let hardware control logic within the display controller 502, embedded inside the BITBLT engine, take care of the entire clipping function. This hardware solution performs all clipping function through hardware, regardless of whether the clipping is color expansion of a monochrome bit map, pattern copy, or any other regular BITBLT.

In order for the hardware to perform all of the necessary operations to support the clipping function as in the conventional software method, a conversion module must be provided within display controller 502 to convert all the X and Y coordinates of the clip rectangle and BITBLT destination rectangle to linear addresses, as performed by software module 405 in FIG. 4. The X and Y coordinate information may be provided to display controller 502 by a CPU host processor 501, as illustrated in FIG. 5.

In addition, an arithmetic logic and control unit must be provided to perform all calculations and decisions based on Equations 1-4, 14-16 and 22-23 set forth above, and as performed by software module 406 in FIG. 4. The results of the hardware module may be passed to the BITBLT engine to execute the corresponding clipping function.

For even a 640 by 480 pixel resolution image, the X-Y coordinate convention may require a 10 bit multiplier plus an 18 bit adder. The size of the multiplier and adder for much higher resolutions (e.g., 1024×768, 2048×1024, or the like) increases accordingly. Thus, to build such features into hardware may require an inordinate number of logic gates, adding to the cost of the VGA. Of course, such a hardware solution may overcome some of the difficulties described above in connection with the software implementation of the clipping function. In the aggregate, however, the relative increase in performance is far outweighed by the increase in gate count. Thus, the prior art hardware solutions for clipping functions may be inadequate.

Thus, it remains a requirement in the art to provide a clipping function which will not seriously degrade overall system performance, regardless of mode, while minimizing overall gate count in a display controller.

SUMMARY AND OBJECTS OF THE INVENTION

A display controller reads image data from a display memory coupled to the display controller and generates an image signal for displaying an image on a display device. A bit block transfer engine performs a bit block transfer of a block of source image data from a source memory, processes the block of source image data, and stores a processed block of image data in a destination memory. A source memory address adjustment means, receives a source memory address and adjusts the source memory address if a start boundary of the block of source image data does not fall on a byte boundary. A byte mask masks bytes of the processed block of image data corresponding to image data not falling within the block of source image data.

The source memory address adjustment means advances the source memory address to a byte boundary preceding the start boundary of the block of source image data if the start boundary of the block of source image data does not fall on a byte boundary. The byte mask masks bytes of the processed block of image data corresponding to data retrieved from the byte boundary preceding the starting boundary of the block of source image data and the starting boundary of the block of source image data.

The source block of image data may comprise a monochrome bit map and the bit block transfer engine color may expand the monochrome bit map to produce the processed block of image data. Alternately, the source block of image data may comprise an image pattern and the processed block of image data may comprise a plurality of the image patterns repeated. The source memory address may be encoded with a Pattern Y-Offset value for a pattern copying bit block transfer.

A decoder receives the source memory address encoded with the Pattern Y-Offset and decodes the source memory address and Pattern Y-Offset values. A plurality of source data latches, coupled to the pattern line counter and the source memory, receives and stores at least a portion of a pattern to be copied in a bit block transfer. A pattern line counter coupled to the decoder and the source data latches, receives the Pattern Y-Offset value and maintains a pattern line count of the at least a portion of the pattern stored in the source data latches. The pattern line counter increments the pattern line count by the pattern Y-Offset value when a first portion of the processed block of image data comprises only a portion of the image pattern.

A host processor interface transmits data and signals to and from a host processor. A host processor calculates the source memory address from source image block dimension data and outputs the source address through the host processor interface to the source memory address adjustment means. Display controller driver software operating in the host processor generates the source memory address. The source memory may comprise a host processor memory or the display memory. The destination memory comprises the display memory.

It is an object, therefore, to perform clipping functions in a display controller without significantly reducing overall system performance.

It is an object, therefore, to perform clipping functions in a display controller where a monochrome bit map is color expanded without significantly reducing overall system performance.

It is an object, therefore, to perform clipping functions in a display controller where a source pattern is repeated and copied to a destination memory without significantly reducing overall system performance.

It is a further object of the present invention to eliminate software shift left operations in a clipping function where the start of a source data block does not fall on a byte boundary.

It is a further object of the present invention to provide the above objects of the present invention in a display controller without significantly increasing the gate count of the display controller.

BRIEF DESCRIPTIONS OF THE DRAWINGS

DETAILED DESCRIPTION OF THE INVENTION

Since the clipping function suffers mostly from the bit-wise shifting operation in the color expand mode, and the extra BITBLT operation in the pattern copy mode, the present invention takes these two functions out of software and implements them in hardware within a display controller. The remaining algorithm functions may remain in software such that the overall increase in gate count is minimized. In order to accomplish this hardware/software solution, the BITBLT parameters may be manipulated such that the BITBLT hardware, together with the imbedded optimum clipping hardware logic may compensate the BITBLT adjusted parameters.

The method of the present invention will now be explained in connection with FIG. 2. From FIG. 2, a New Source Start Address (NSSA) may be calculated as illustrated in Equations 24 and 25.

$$NSSA=OSSA+(X\text{-Offset}) \quad (EQ\ 24)$$

$$NSSA=OSSA+(3\ \text{Bytes}) \quad (EQ\ 25)$$

Figure 1:
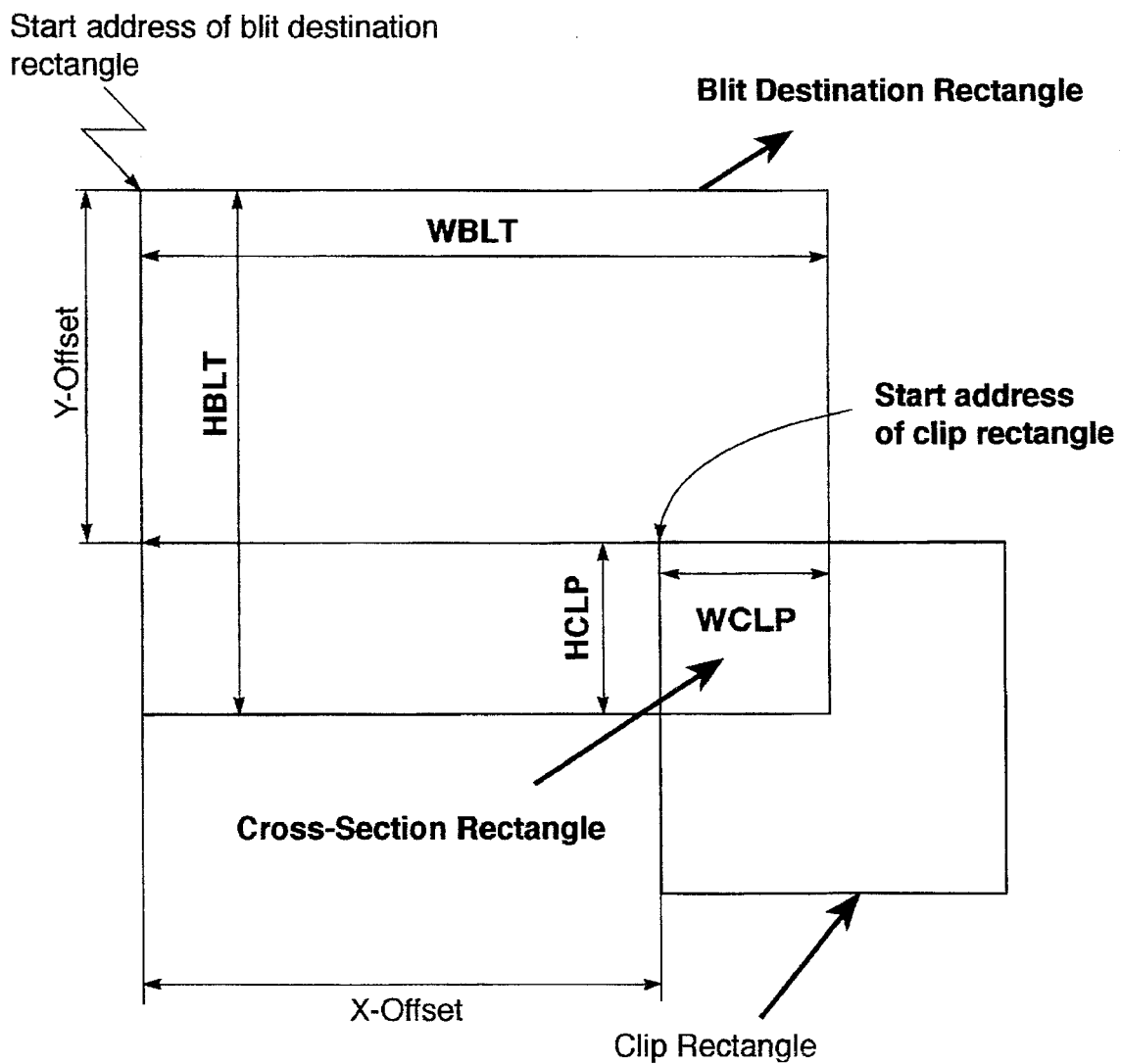
FIG. 1 is a diagram illustrating X and Y offset values in a clipping function.
Figure 2:
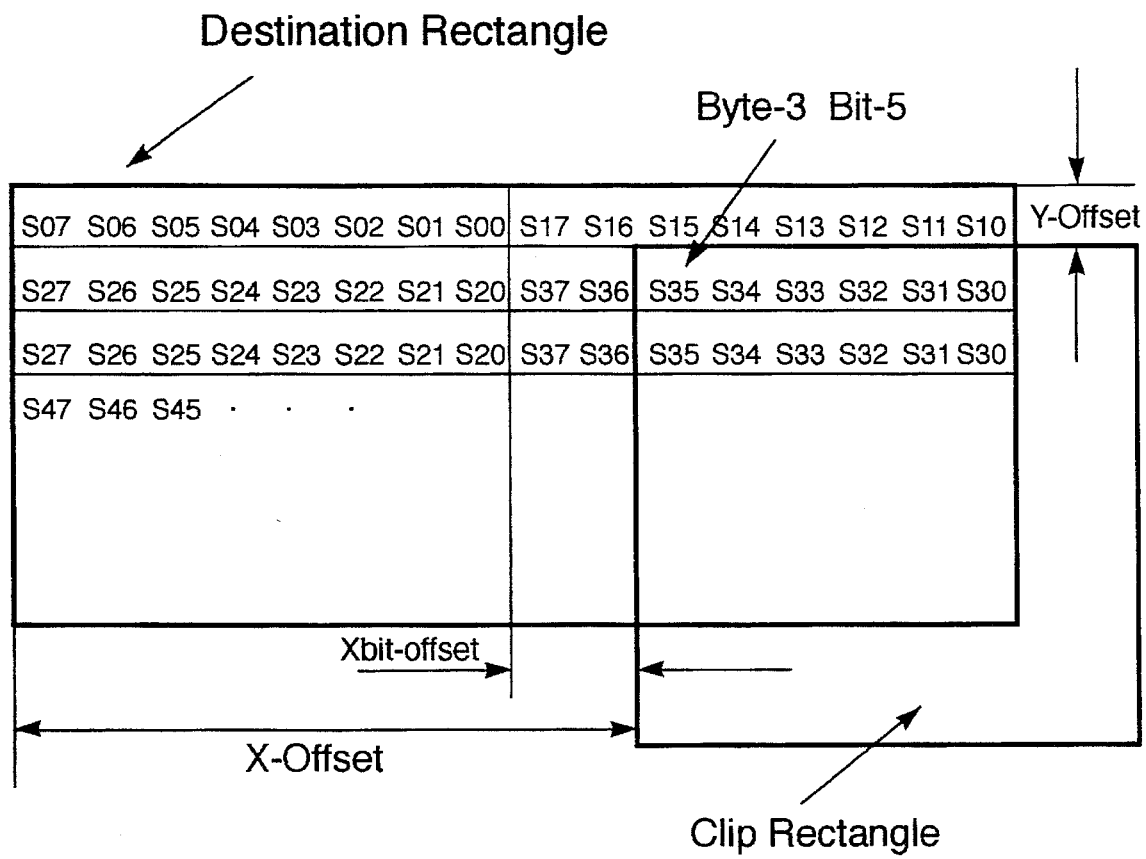
FIG. 2 is a diagram illustrating the correlation between clipping cross-section rectangle and unexpended source data bits with 8 bits per pixel color depth when clipping on a monochrome bit map across the byte.

The first bit of source data to be expanded may be the most significant bit (MSB) of the fourth byte (e.g., S37 in FIG. 2) rather than bit five of that byte (S35 in FIG. 2). Using the MSB makes the source start address aligned byte-wise and thus eliminates the need for bit-wise shift operations. Instead of using bit-wise shift operations, a hardware byte mask may be used when writing expanded data into destination memory, as discussed below. Data not intended to be expanded and written into destination memory is expanded by the BITBLT engine, but is blocked from being written into destination memory. Such a hardware mask does not require iterative loops to index to a given bit position within a byte (as in a bit-wise shift function). Thus, the degradation in system performance due to such bit-wise shift functions may be avoided.

In order to select the source start address to be aligned with a byte boundary, the BITBLT parameters, such as the Destination Start Address (DSA), Width of BITBLT line, and number of bytes masking from the beginning of each BITBLT line, may be adjusted such that the BITBLT engine does not change any destination memory locations except those intended to be changed with a corresponding source bit from the unexpanded source byte. Such adjustments to BITBLT parameters may be illustrated with the aid of FIG. 2 as follows.

First, the Destination Start Address (DSA) may be started earlier. For eight bpp color depth, the DSA may be started two bytes earlier. For 16 bpp color depth, the DSA may be started four bytes earlier. For 24 bpp color depth, the DSA may be started six bytes earlier. For 32 bpp color depth, the DSA may be started eight bytes earlier. Equations 26–29 illustrate the relationship between color depth and DSA adjustment, where ODSA is the original DSA and NDSA is the new, adjusted DSA.

$$Xbit\_Offset=X\text{-Offset mod }8=10\text{ mod }8 \quad (EQ\ 26)$$

$$Xbit\_Offset=2 \quad (EQ\ 27)$$

Therefore:

$$NDSA=ODSA-(Xbit\_Offset*pixel\_color\_depth) \quad (EQ\ 28)$$

$$NDSA=ODSA-(2* (\text{\#of Bytes per Pixel})) \quad (EQ\ 29)$$

Next, 2, 4, 6, or 8 bytes may be added to the BITBLT width, corresponding to 8, 16, 24, or 32 bpp pixel color depth, respectively, as illustrated in Equation 30, where NWBLT is the new BITBLT width, and OWBLT is the original BITBLT width.

$$NWBLT=OWBLT+(Xbit\_Offset* pixel\_color\_depth) \quad (EQ\ 30)$$

BITBLT hardware may then write a destination start address from a new location as calculated in Equation 28 above, except at the beginning of each BITBLT line, where a number of bytes from the BITBLT write operation would be masked out as illustrated in Equation 31. N represents the mask value, or the Number of Bytes Masked Off per BLIT Line.

$$N=Xbit\text{-}Offset* pixel\_color\_depth \quad (EQ\ 31)$$

Figure 5:
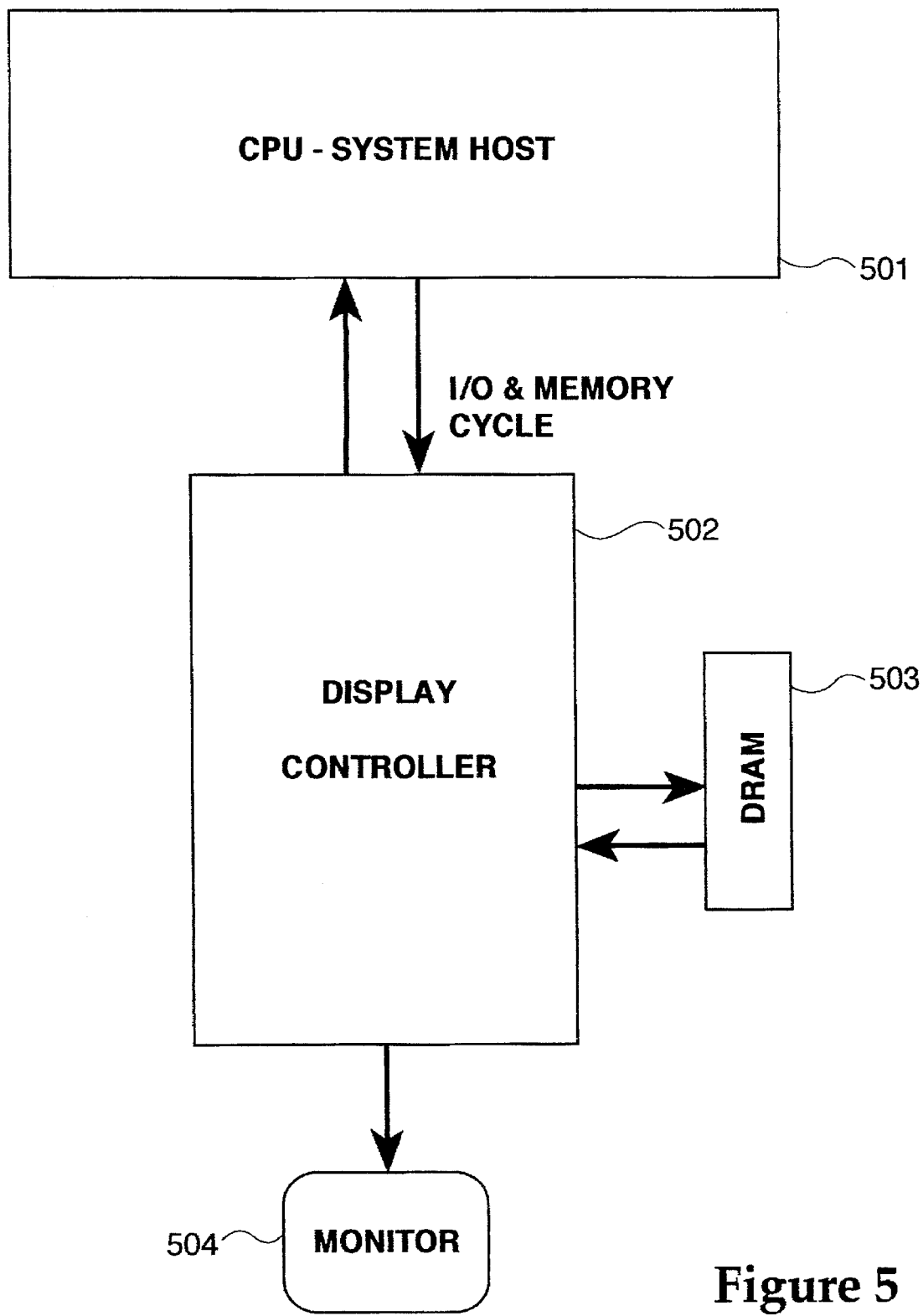
FIG. 5 is a block diagram illustrating a prior art hardware solution for the clipping function.

The driver software may perform the required calculations to determine SSA, DSA, WBLT, and N as illustrated in Equations 25, 26, 28, 30 and 31) and pass these values to the display controller through the host CPU. The BITBLT engine may then use these values to expand source data and write the resultant data into destination memory while the first N Bytes at the beginning of each BITBLT line would not be written and would be masked out through the mask operation on the corresponding CASs. This technique requires only logic hardware for masking out the first N bytes determined by Equation 31 on each BITBLT line, as will be explained in more detail below. Thus, the technique of the present invention does not require nearly as high a gate count as the all-hardware solution of FIG. 5.

With regard to pattern copy mode, the method of the present invention will be explained in detail with respect to FIG. 3. In pattern copy mode, the new source start address (NSSA) may remain unchanged from the original source start address (OSSA) and thus may be referred to simply as source start address (SSA). The original pattern may be used without any change of source start address.

$$NSSA=OSSA=SSA \quad (EQ\ 32)$$

In pattern copy mode of the BITBLT engine, the entire 8 by 8 pixel pattern tile of the source pattern may be read from the display memory. It should be noted that an 8 by 8 pixel pattern tile is shown here for purposes of illustration only. Other sized pattern tiles may be used without departing from the spirit and scope of the present invention.

The byte equivalent of 8 by 8 pixel pattern tile is obtained by the number of pixels times the pixel color depth. For example, in an 8 bpp mode, (8 by 8 pixels) * (1 byte/pixel) =64 bytes allocated in display memory for the source pattern. In a 32 bpp mode, (8 by 8 pixels) * (4 bytes/pixel) =256 bytes allocated in display memory for the source pattern.

For the first line of the clip cross-section rectangle, the source byte to be used would have to have an offset equivalent to the Pattern Y-Offset. Thus, in addition to the source start address (SSA) the driver software should also pass the value of Pattern Y-Offset to the display controller through the host interface. Since in pattern copy mode, the source start address (SSA) may be aligned to two double word boundaries, the three least significant bits (LSB) of SSA may remain zero in this mode.

In order to avoid having an extra I/O write cycle in passing the value of the Patter Y-Offset to the display controller, the value of Pattern Y-Offset may be added to the value of the SSA (in the three LSB) and transferred as combined SSA and Pattern Y-Offset in one memory map I/O write cycle into the display controller. CPU arithmetic cycles needed to perform such an addition may take less time than an additional I/O cycle needed to send SSA and Pattern Y-Offset separately to the display controller.

At the same time, hardware inside the display controller decodes the three LSB of the combined SSA/Pattern Y-Offset to obtain values for Pattern Y-Offset and SSA. The SSA value may be obtained by replacing the three LSB in the combined SSA/Pattern Y-Offset value transmitted with three zeros, as the pattern may be aligned to two double word boundaries.

Figure 3:
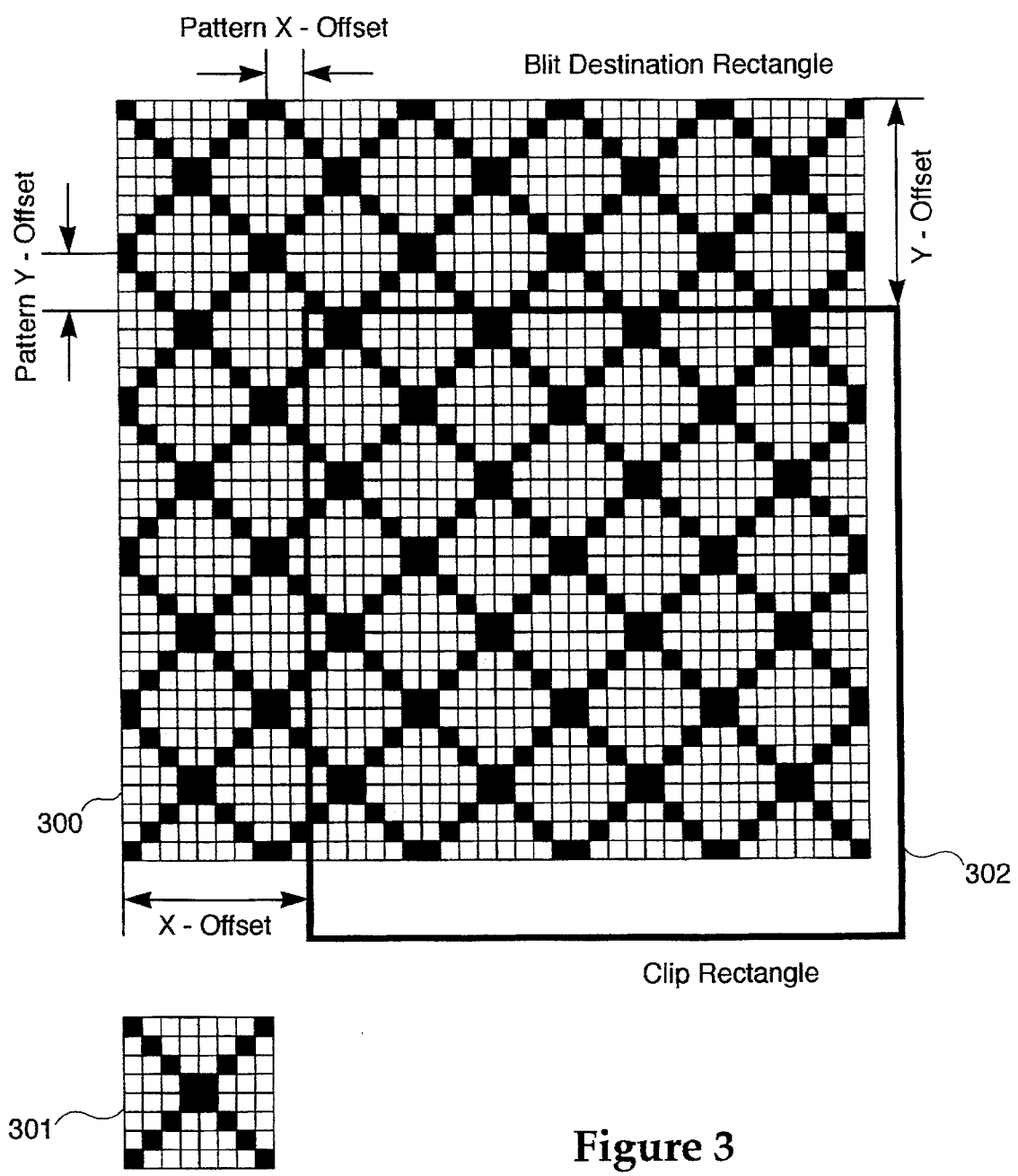
FIG. 3 is a diagram illustrating clipping on an 8 by 8 pattern across the pattern.
Figure 6:
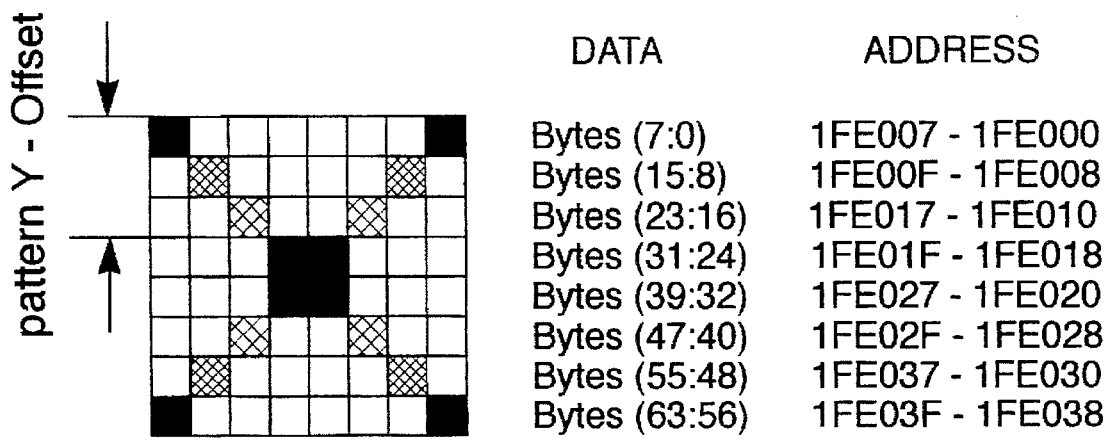
FIG. 6 is a diagram illustrating the address location of a source pattern in a display memory.

An example of a source pattern with 8 bpp pixel color depth which may be used to fill in destination memory is illustrated in FIG. 3, and in more detail in FIG. 6. Since the Pattern Y-Offset is three lines in FIG. 3, the value of the combined SSA/Y-Offset transmitted by driver software to the display controller may be as shown in Equation 33.

$$SSA/Y\text{-}Offset=1FE000+3=1FE003 \quad (EQ\ 33)$$

The BITBLT engine inside the display controller decodes the SSA as 1FE000 and the Pattern Y-Offset as 3. Thus, the entire 64 bytes of the source pattern (memory locations 1FE3F-1FE000) may be fetched from display memory and stored in the 64 byte source latches of the BITBLT engine. When it is time to read the pattern from these source latches to fill a front row of destination clip cross-section rectangle, the read pointer inside the BITBLT engine may use the Pattern Y-Offset to skip the first 24 bytes of source latches and start reading on bytes 25 to 32, which are the bytes corresponding to the fourth line of the source pattern. By the time the BITBLT engine finishes writing the fifth line of the cross-section clip rectangle (corresponding to the last line of the source pattern) writing into the sixth line of that rectangle may start. At this time, the BITBLT engine source read pointer may read the first eight bytes from the source latches, addresses 1FE007 to 1FE000, corresponding to the first line of the source pattern from the source latches. The details of this process will be explained in more detail below.

The Patten X-Offset and procedure for adjusting the BITBLT parameters for pattern mode are performed the same as in monochrome bit map color expansion discussed above, with the exception that instead of adjusting Xbit_Offset, the term X-Offset is used. Note that by using this method, several extra BITBLT operations have been eliminated on the source pattern and the device driver is not loaded with as many CPU time consuming tasks. On the other hand, the X-Y coordinate conversion is not required, and the clipping algorithm in the present invention may be implemented without increasing overall gate count significantly.

Figure 7:
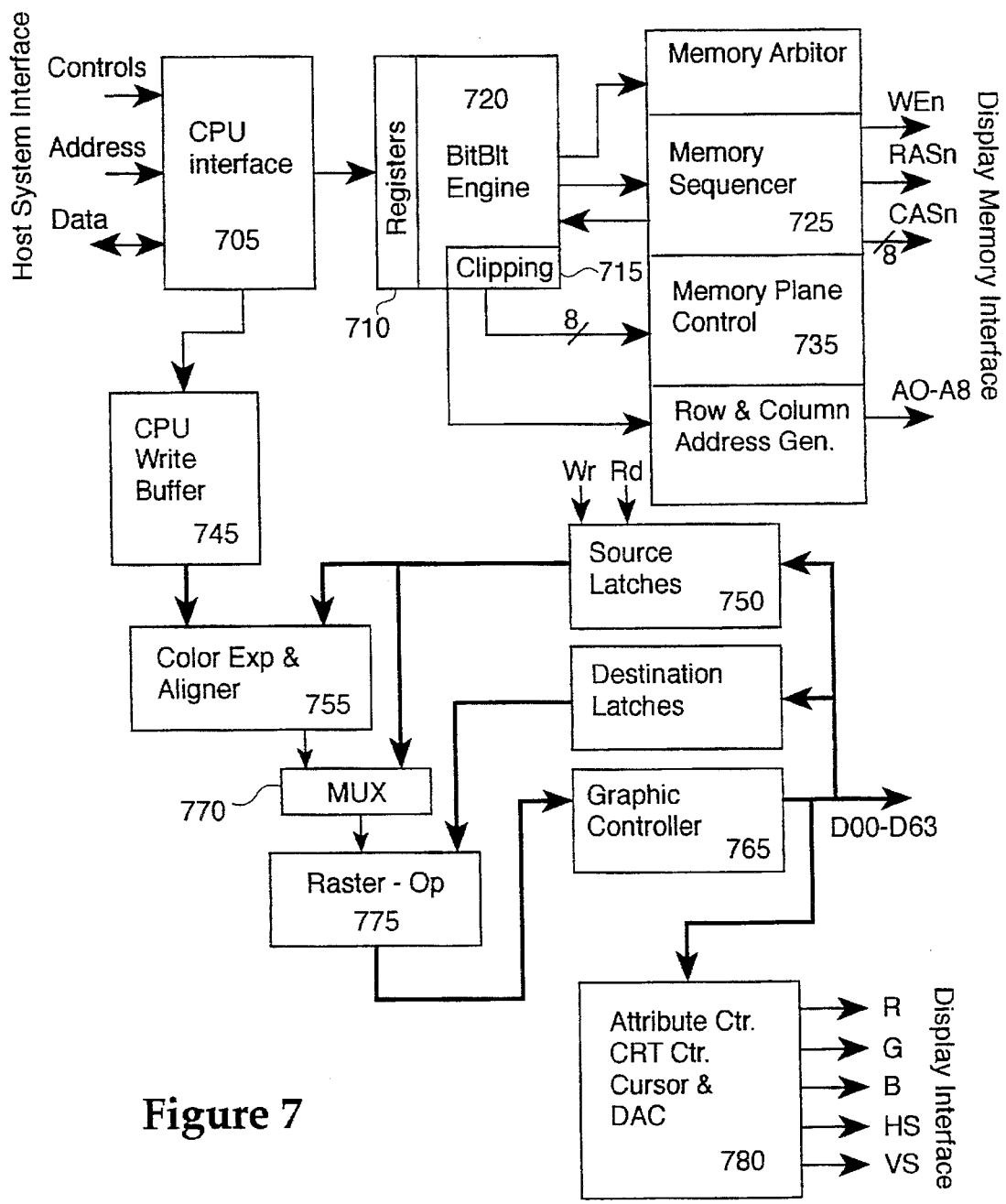
FIG. 7 is a block diagram illustrating different blocks of a display controller in relation to a BITBLT engine and clipping logic.

FIG. 7 illustrates a different block of the display controller including BITBLT engine 720 and controlling scheme, together with data flow. BITBLT engine 720 may send an 8-bit wide control signal to memory sequencer 725 which may mask out the corresponding CASn(0) through CASn(7) signals. In this manner, BITBLT engine 720 may prohibit or allow any write into corresponding bytes in destination memory. Source latches 750 are provided with Rd_pointer controls by BITBLT engine 720.

As discussed above, in addition to clipping rectangle width, height, New SSA, and New DSA, BITBLT engine 720 may also receive Xbit-Offset or Pattern X-Offset from the device driver in color expanded mode or pattern copy mode, respectively. BITBLT engine 720 uses the new SSA, new DSA, clip width, and clip height cross-section rectangle parameters to perform the BITBLT operation as described in the Background of the Invention, whether in color expand or pattern copy mode. The new destination start address DSA is already adjusted by the device driver to the original DSA minus Xbit_Offset or Pattern X-Offset for color expand and pattern copy modes, respectively. Thus, the first N pixels at the beginning of each BITBLT line may need to be masked out, where N is equal to Xbit_Offset in color expand mode and pattern X-Offset in pattern copy, respectively.

Note that pixel color depth may be assumed to be 1 byte per pixel for the sake of illustration. However, pixel color depth may be 2, 3, or 4 bytes per pixel for 16, 24, and 32 bpp pixel color depths, respectively. For any resolution other than 8 bpp, the pixel color depth must be multiplied by Xbit_Offset or Pattern X-Offset.

The values of N, or the mask value, may be given to clip hardware logic 715 inside BITBLT engine 720 from the device driver software through CPU interface 705 into a five bit clip mask register (CMR) in BITBLT registers 710. Based on the CMR value, and destination start address for each line of the BITBLT transfer, clip hardware logic 715 may calculate the number of destination pixels or bytes which may have to be masked out on the first 2-double word boundary (2-DW) and second 2-DW and so on from destination memory locations on each bit line. Such information may be used to generate a corresponding 8-bit control signal to memory plane control 735 to control CASn(0) to CASn(7) signals.

CPU interface 705 also transmits monochrome bit map data through CPU write buffer 745 to Color Expansion and Aligner 755. Expanded color data may then pass through MUX 770 to Raster-0p 775 to graphics controller 765. Graphics controller 765 may output display image data to attribute controller, CRT controller, cursor controller and DAC 780 which may in turn generate analog output signals for display on a CRT or the like.

Figure 8:
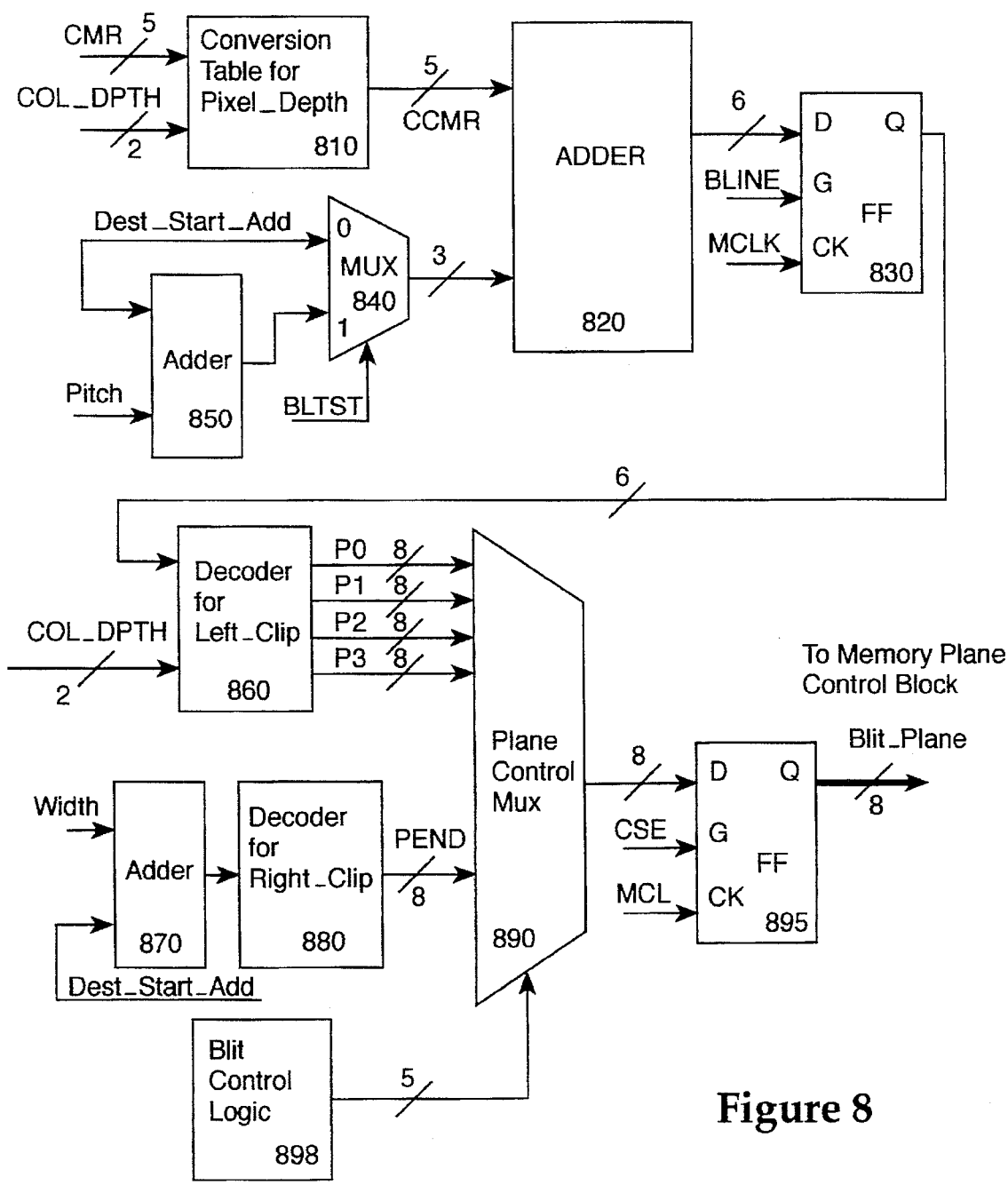
FIG. 8 is a diagram illustrating clipping in the X direction at the beginning and end of the BLIT line.

Referring now to FIG. 8, implementation of C-Offset for 8, 16, 24, and 32 bpp color depth with misaligned destination memory will be discussed. As illustrated in FIG. 8, depending upon pixel color depth, the value of Clip Mask Register (CMR) may be converted through conversion table logic 810 to output the Converted Clip Mask Register value CCMR. The operation of conversion table logic 810 is illustrated in Table 1. In Table 1, SHL represents the Shift Left Operation.

TABLE 1

| Pixel Color Depth (bpp) | FCMR(4:0) |
|---|---|
| 8 | CMR(4:0) |
| 16 | SHL{CMR(4:0),1} |
| 24 | CMR(4:0) |
| 32 | SHL{CMR(4:0),2} |

Referring back to FIG. 8, before writing the memory location of the first line of the clip cross-section rectangle, adder 820 adds the destination start address (DSA) to the converted clip mask register value (CCMR). When it is time to write to the memory location corresponding to the first line of a clip cross-section rectangle, the results of adder 820 pass to flip-flop 830. Timing of flip-flop 830 may be controlled by signal BLINE which may be generated by BITBLT engine 720 of FIG. 7.

Signal BLINE remains active high until the bit block transfer process starts, and then goes low until the end of each active BITBLT line, where it goes high for one MCLK cycle. This timing method allows enough setup time at the D input of flip flop 830. During the time in which memory locations corresponding to the first line of the clip cross-section rectangle are written, the Dest_Start_Add (DSA) value is added to the Dest_Pitch value in adder 850, the result being the DSA value for the second line of the clip cross-section rectangle. This revised DSA value may then be switched through MUX 840 and added with CCMR in adder 820.

The six bit output of adder 820 remains on the D input of flip-flop 830 until the end of the first line of the clip cross-section rectangle when BLINE goes active. At that time, with the rising edge of MCLK, the output of flip flop 830 outputs data which may be used by decoder 860 to generate the eight bit p0 to P3 memory plane control signals for first through fourth CAS time slots.

The two bits COL_DPTH input into decoder 860 determines the color depth, which may be used in conjunction with the three MSB of the output of flip flop 830 to send a value of 00 or FF for the P0 to P3 outputs, where the three least significant bits (LSB) of the FF's output is used to decode the corresponding memory plane values controlling the CASn(0) to CASn(7) in the memory plane module.

After the first four CAS time slots corresponding to memory planes P0 to P4, all other CAS time slots should be enabled (i.e., memory plane remains high for all 8 bits, or FF). By the end of the BITBLT line, the width of the clip cross-section rectangle may occur at any location within the last 2-double word (2DW) boundary (i.e., last 8 bits memory plane). To control such a case, the last three significant bits of the DSA are added in adder 870 to the three least significant bits of the width register value to generate the three-bit input to decoder 880.

Decoder 880 outputs 8 bit memory plane control signal PEND for the last 8 CAS controlling write into memory locations corresponding to the clip cross-section rectangle at the end of a line or on the right hand side of the clip cross-section rectangle. To control timing of memory plane control signals P0, P1, P2, P3 and PEND, five input 8-bit plane control multiplexer 890 may be employed. BITBLT control logic 898 may generate five corresponding enable signals which open one 8-bit memory plane control signal P0, P1, P2, P3, or PEND at a time to the output of multiplexer 890.

The results of multiplexer 890 may be clocked by flip-flop 895 with an active high control signal CSE and the rising edge of MCLK to generate a final 8-bits BITBLT Plane signal. The CSE has timing controlled by memory sequencer 725 of FIG. 7 in relation to the RAS and CAS state machines. The 8-bit BITBLT Plane signal is fed to memory plane control 735 of FIG. 7 to control the CASn(0) to CASn(7).

Figure 4:
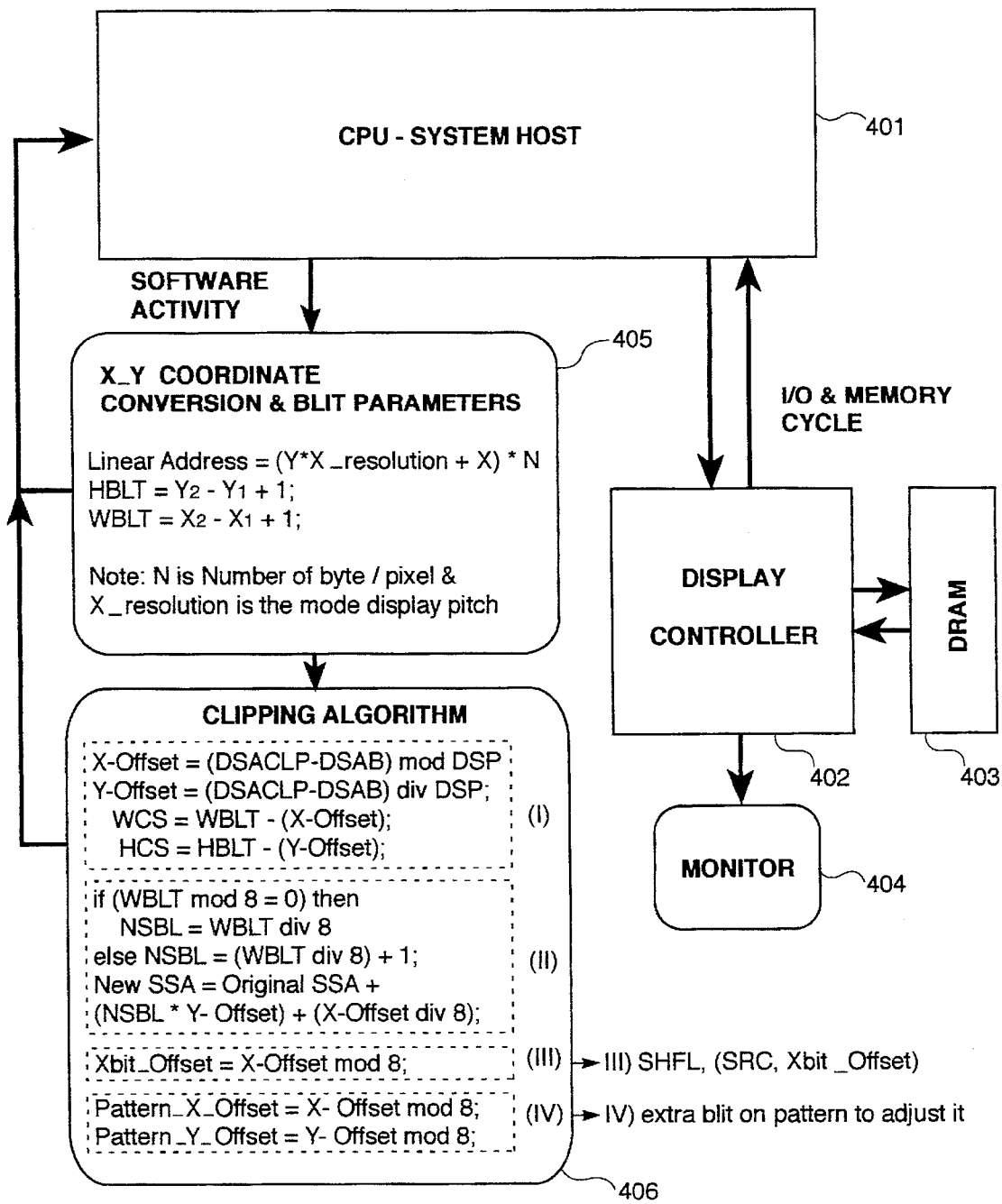
FIG. 4 is a block diagram illustrating a prior art software solution for the clipping function.
Figure 9:
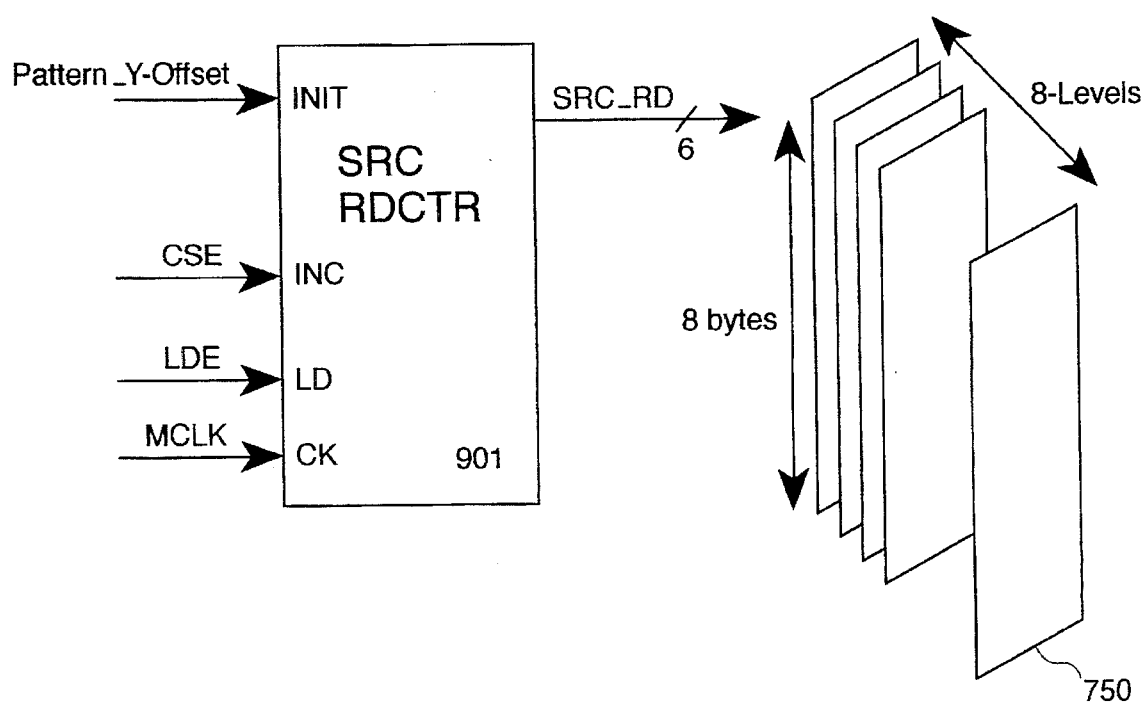
FIG. 9 is a diagram illustrating clipping in the Y direction across a pattern with 8 bits per pixel color depth.

Top and bottom clipping in the pattern copy mode will now be explained in connection with FIGS. 7 and 9. Since the HCS, or height of the clip cross-section, is determined by driver software (e.g., Software module 406 of FIG. 4) the top and bottom numbers of lines to be clipped may be defined by a BITBLT height counter when loaded with the value of HCS. By controlling the read pointer to the source latches 750 of FIG. 7 (in 8 bpp color depth) or offset the source address to be fetched into the source latches 750, the adjustment and required offset in the Y direction may be performed on the pattern. Note that source latches 750 may be 64 bytes is size, arranged as eight bytes by eight levels.

In 8 bpp color depth mode, the entire 8 by 8 pattern tile of information may be fetched into source latches 750 with one fetch cycle from display memory. In 16 bpp color depth mode, source latches 750 may hold only half of the 8 by 8 pattern tile. In 24 and 32 bpp color depth modes, source latches 750 may hold only two lines of the 8 by 8 pattern tile.

The vertical clipping method on the 8 by eight pattern tile with 8 bpp color depth may be performed by controlling the read pointer Rd of source latches 750. Once source latches 750 are filled with 64 bytes of pattern data, there is no need to write into source latches 750 again until the entire bit block transfer is completed, as illustrated in FIG. 9.

Note that by the time read counter 901 reaches the last line of source latches 750, it resets and reads the first line of pattern data through the 8 by 8 source latches 750 from the first level. This process is repeated until the end of the clip cross-section BITBLT line is reached.

In 16, 24, or 32 bpp color depth modes, the process may be somewhat different. In 16 bpp color depth mode, after writing four lines of the pattern, source latches 750 may be full. By immediate destination write cycle, the information of the first line of the patter may be written into corresponding pixel memory locations. At the second scan line of the clip cross-section rectangle, information in the second line of the pattern is written in to corresponding pixel memory locations. Until the fourth line of the pattern, writing into destination memory is continued.

After the fourth line of data is written into the destination, source latches 750 are ready (i.e., empty) to receive the next four lines of pattern data. After the second source fetch cycle, the destination write cycles start again and writes information from source latches 750 into corresponding pixel line memory locations. This process is continued until the end of the clip cross-section BITBLT rectangle is reached.

In 24 and 32 bpp color depth modes, source latches 750 and read write pointer Rd and Wr have the same cycle as the 16 bpp color depth mode, except source read to destination write cycle repeats for every two line of pattern data rather than for every four lines of pattern data. Two lines of pattern data is equivalent to 48 bytes and 64 bytes in 24 and 32 bpp color depth modes respectively. Note that because of the uneven nature of the structure of 24 bpp color depth mode, every source fetch cycle may use only six levels out of the eight levels of source latches 256.

Figure 10:
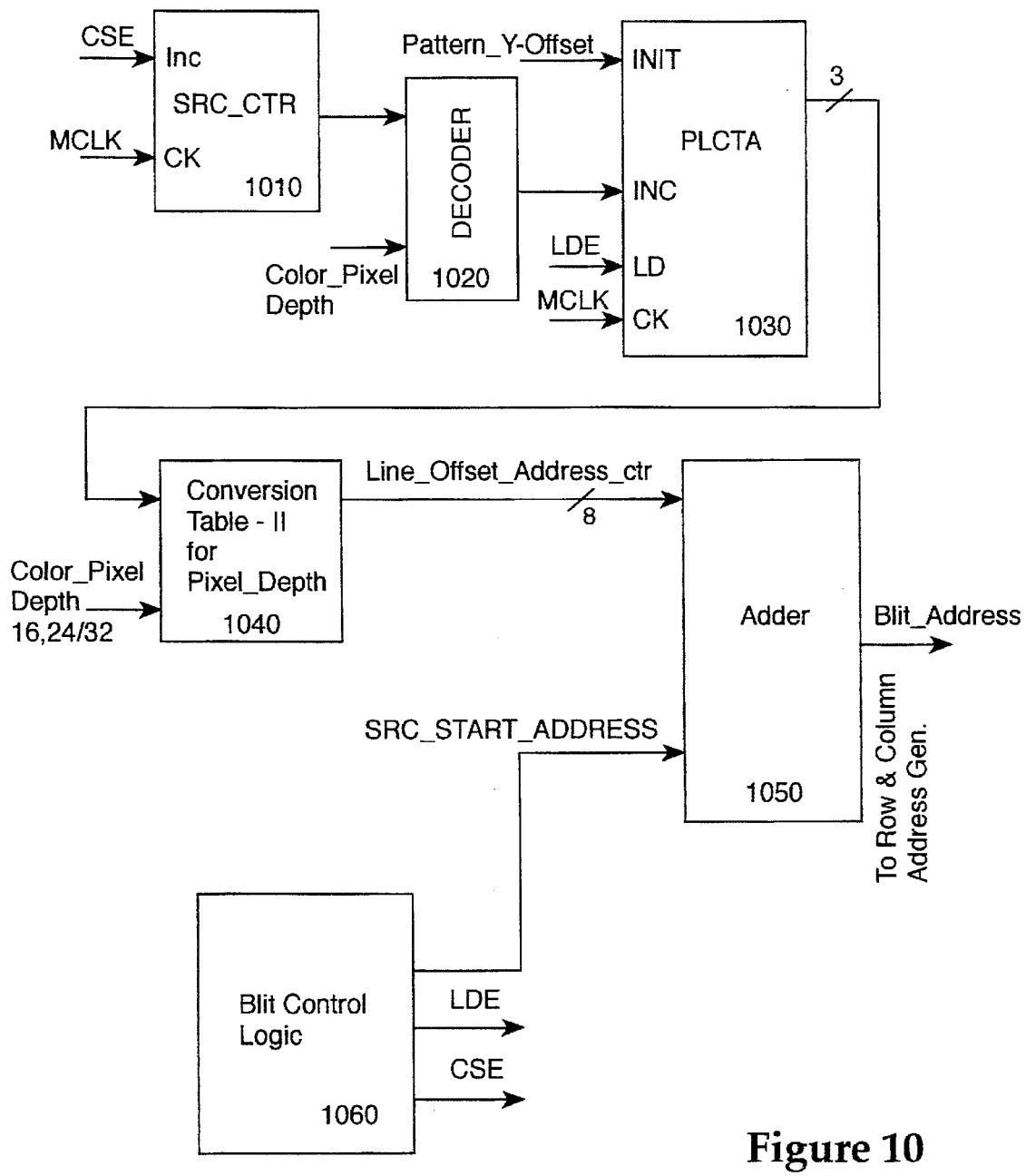
FIG. 10 is a block diagram illustrating hardware for address calculation in 16 and 24/32 bits per pixel pattern copy mode based on Pattern Y-Offset.

FIG. 10 illustrates the logic implementation of clipping across a pattern in the Y direction for 16, 24 and 32 bpp color depth modes. The decoded pattern Y-Offset from the three least significant bits of the source start address are initially loaded into three bit pattern line counter PLCTR 1030 which is a loadable up-counter. Every CAS time slot, 8 bytes of data from display memory are fetched to source latches 750. Every two CAS time slots, 16 bytes of source pattern are fetched to 16 bytes of source latches 750 which is equivalent to one line of the source pattern worth of data in 16 bpp color depth mode. In a 16 bpp color depth mode, 16 bytes time 8 lines equals 128 total data bytes in the pattern tile.

Thus, PLCTR counter 1030 should increment every 16 bytes or every two CAS time slots during the pattern source fetch cycle. The pattern Y-Offset which is initially loaded into PLCTR counter 1030 could offset the start address of the source pattern to be fetched by one, two, or all the way to seven lines of data which is equivalent to 16, 32, of up to 112 bytes of data. Source counter 1010 may be incremented every CAS time slot with control signal CSE which may be initiated by memory sequencer 725 of FIG. 7 and finally generated by BITBLT control logic 1060 inside BITBLT engine 720 of FIG. 7.

The increment signal to PLCTR counter 1030 may be generated by source counter 1010 and decoder 1020 which may be controlled by pixel color depth as illustrated in FIG. 10. The results of PLCTR 1030 may be passed through conversion table 1040. The operation of conversion table 1040 is illustrated in Table 2 below. The output of conversion table 1040 is passed to 22 bit adder 1050 where it is added to the value of the source start address from BITBLT control logic 1060 in BITBLT engine 720 of FIG. 7. Based on the value of the Pattern Y-Offset, PLCTR counter 1030 may start from a different line of the pattern tile. Thus, the address which is added to the source start address may be offset by a corresponding number of lines (Pattern Y-Offset) in the pattern tile.

As both 22 bit adder 1050 and PLCTR 1030 together with source counter 1010 are existing logic elements in BITBLT engine 720, the increase in gate count in implementing the present invention is minimal.

TABLE 2

| Pixel Color Depth (bpp) | Line Offset Address Ctr(7:0) |
| --- | --- |
| 16 | SHL{PLCTR(2:0),4} |
| 24 | SHL{PLCTR(2:0),5} |
| 32 | SHL{PLCTR(2:0),5} |

Thus, in the present invention, software still performs the X and Y coordinate conversion to linear addresses and all other clipping calculation algorithms which do not have much impact on system performance. However, the adjusted clip cross-section BITBLT parameters (e.g., width, source and destination start address) are passed together with the number of shift left operations (i.e., Xbit-Offset in Eq. 26) required for source data to be aligned to the byte boundary, to the display controller.

As a substitute for the software shift left operations, however, by using parameter adjustment and mask operations on the BITBLT write cycle through hardware BITBLT and clipping logic. In this manner, shift left software operations which degrade CPU operation may be reduced or eliminated without substantially increasing overall gate count of the display controller.

Thus, monochrome bit map color conversion of pattern copy routines may be performed without degradation in overall system performance, or without substantially increasing gate count.

While the preferred embodiment and various alternative embodiments of the invention have been disclosed and described in detail herein, it may be apparent to those skilled in the art that various changes in form and detail may be made therein without departing from the spirit and scope thereof.

For example, while illustrated for 8, 16, 24, and 32 bpp color depth modes, other pixel depth may be supported with appropriate modifications to hardware and software. In addition, while illustrated for monochrome bit map and patten copy modes, the technique and apparatus of the present invention may be similarly utilized in applications where it may be desirable to eliminate a number of shift left operations in software.

What is claimed is:

1. A display controller for performing a clipping function by reading source image data from a display memory coupled to the display controller, said source image data representing a clipped portion of an image to be color expanded or a pattern to be copied, and generating an image signal for displaying an image comprising a color expanded clipped portion of an image or a repeated pattern on a display device, said display controller including:

a bit block transfer engine, for performing a bit block transfer of a block of the source image data from a source memory, processing the block of source image data, and storing a processed block of image data in a destination memory, said bit block transfer engine including:

a clip mask register for storing a clip mask value representing a number of pixels at the beginning of each BITBLT line to be masked out;

source memory address adjustment means, coupled to said clip mask register, for receiving a source memory address, and the clip mask value, and adjusting the source memory address in accordance with the clip mask value if a start boundary of the block of source image data does not fall on a byte boundary; and byte masking means, coupled to said clip mask register, for masking bytes of the processed block of image data according to the clip mask value for data corresponding to image data not falling within the block of source image data when storing the processed block of image data in the destination memory.

2. The display controller of claim 1, wherein said source memory address adjustment means advances the source memory address to a byte boundary preceding the starting boundary of the block of source image data if the starting boundary of the block of source image data does not fall on a byte boundary.

3. The display controller of claim 1, wherein said byte masking means masks bytes of the processed block of image data corresponding to data retrieved from the byte boundary preceding the starting boundary of the block of source image data and the starting boundary of the block of source image data.

4. The display controller of claim 3, wherein said source block of image data comprises a monochrome bit map and said bit block transfer engine color expands said monochrome bit map to produce the processed block of image data.

5. The display controller of claim 3, wherein said source block of image data comprises an image pattern and the processed block of image data comprises a plurality of the image pattern repeated, said source memory address is encoded with a Pattern Y-Offset value for a pattern copying bit block transfer, said display controller further comprising:

decoder means, for receiving the source memory address encoded with the Pattern Y-Offset and decoding the source memory address and Pattern Y-Offset values;

a plurality of source data latches, coupled to the source memory, for receiving and storing at least a portion of a pattern to be copied in a bit block transfer; and a pattern line counter, coupled to the decoder means and the source data latches, for receiving the Pattern Y-Offset value and maintaining a pattern line count of the at least a portion of the pattern stored in the source data latches;

wherein the pattern line counter increments the pattern line count by the pattern Y-Offset value when a first portion of the processed block of image data comprises only a portion of the image pattern.

6. The display controller of claim 3, further comprising: host processor interface means, for transmitting data and signals to and from a host processor, wherein a host processor calculates the source memory address from source image block dimension data and outputs the source address through the host processor interface means to the source memory address adjustment means.

7. The display controller of claim 6, wherein display controller driver software operating in the host processor generates the source memory address.

8. The display controller of claim 6, wherein the source memory comprises a host processor memory.

9. The display controller of claim 6 wherein the source memory comprises the display memory.

10. The display controller of claim 6 wherein the destination memory comprises the display memory.

11. The display controller of claim 5, further comprising:

a pattern line counter for incrementing a pattern Y-offset address;

a pixel depth conversion table, coupled to the pattern line counter for receiving the pattern Y-offset address and a pixel depth value and for outputting a line offset address; and an adder, coupled to the pixel depth conversion table, for receiving a source start address, adding the line offset address and outputting a blit address.

12. A method for color expansion and pattern copying by reading source image data from a display memory coupled to the display controller, said source image data representing a clipped portion of an image to be color expanded or a pattern to be copied, and generating an image signal for displaying an image comprising a color expanded clipped portion of an image or a repeated pattern on a display device, said method including the steps of:

performing a bit block transfer of a block of the source image data from a source memory, processing the block of source image data, and storing a processed block of image data in a destination memory, wherein said step of performing a bit block transfer further comprises the steps of:

receiving a source memory address, receiving a clip mask value, adjusting the source memory address according to the clip mask value if a start boundary of the block of source image data does not fall on a byte boundary;

said step of storing a processed block of image data further comprises the step of:

masking bytes of the processed block of image data from the clip mask value for data corresponding to image data not falling within the block of source image data; and storing mask bytes of the processed block of image data at a destination memory address.

13. The method of claim 12, wherein said step of adjusting the source memory address further comprises the step of advancing the source memory address to a byte boundary preceding the starting boundary of the block of source image data if the starting boundary of the block of source image data does not fall on a byte boundary.

14. The method of claim 13, wherein said step of masking bytes comprises the step of masking bytes of the processed block of image data corresponding to data retrieved from the byte boundary preceding the starting boundary of the block of source image data and the starting boundary of the block of source image data.

15. The method of claim 14, wherein said source block of image data comprises a monochrome bit map and said bit block transfer color expands said monochrome bit map to produce the processed block of image data.

16. The method of claim 14, wherein said source block of image data comprises an image pattern and the processed block of image data comprises a plurality of the image pattern repeated, said source memory address is encoded with a Pattern Y-Offset value for a pattern copying bit block transfer, said step of performing a bit block transfer further comprising the steps of receiving the source memory address encoded with the Pattern Y-Offset and decoding the source memory address and Pattern Y-Offset values;

receiving and storing, in a plurality of source data latches, coupled to the source memory, at least a portion of a pattern to be copied in a bit block transfer, receiving, in a pattern line counter, coupled to the decoder means and the source data latches, the Pattern Y-Offset value and maintaining a pattern line count of the at least a portion of the pattern stored in the source data latches, and incrementing the pattern line count by the pattern Y-Offset value when a first portion of the processed block of image data comprises only a portion of the image pattern.

17. The method of claim 14, wherein the step of performing a bit block transfer of a block of source image data from a source memory further comprises the steps of:

calculating, in a host processor the source memory address from source image block dimension data, and outputting the source address through a host processor interface means.

18. The method of claim 17, wherein display controller driver software operating in the host processor generates the source memory address.

19. The method of claim 14, wherein the step of performing a bit block transfer of a block of source image data from a source memory comprises the step of performing a bit block transfer of a block of source image data from a host processor memory.

20. The method of claim 14 wherein the step of performing a bit block transfer of a block of source image data from a source memory comprises the step of performing a bit block transfer of a block of source image data from the display memory.

21. The method of claim 14 wherein the step of storing a processed block of image data in a destination memory comprises the step of storing a processed block of image data in the display memory.

22. The method of claim 16, further comprising the steps of:

generating a pattern Y-offset address;

receiving, in a pixel depth conversion table, the pattern Y-offset address and a pixel depth value and outputting a corresponding line offset address; and adding a source start address to the line offset address and outputting a blit address.

\* \* \* \* \*